US007209048B1

(12) United States Patent
Pace et al.

(10) Patent No.: US 7,209,048 B1
(45) Date of Patent: Apr. 24, 2007

(54) DEVICE FOR MONITORING AND ALERTING OF A POWER DISRUPTION TO ELECTRICAL EQUIPMENT OR AN APPLIANCE

(76) Inventors: Joseph R. Pace, 818 N. 77th St., Omaha, NE (US) 68114; Michelle L. Pace, 818 N. 77th St., Omaha, NE (US) 68114

( * ) Notice: Subject to any disclaimer, the term of this patent is extended or adjusted under 35 U.S.C. 154(b) by 349 days.

(21) Appl. No.: 10/798,003

(22) Filed: Mar. 11, 2004

Related U.S. Application Data

(60) Provisional application No. 60/453,777, filed on Mar. 11, 2003.

(51) Int. Cl.
*G08B 21/00* (2006.01)
*H02H 3/00* (2006.01)
*H02H 7/00* (2006.01)
*H02H 11/00* (2006.01)
*H02H 1/04* (2006.01)
*H01R 13/625* (2006.01)

(52) U.S. Cl. ...................... 340/687; 340/438; 340/635; 340/654; 340/655; 340/656; 340/686.1; 361/102; 361/103; 307/326; 307/327; 439/214; 439/215; 439/345; 439/353

(58) Field of Classification Search ............ 340/686.1, 340/687, 438, 635, 654–656; 361/102, 103; 307/326, 327; 439/214–215, 353, 345
See application file for complete search history.

(56) References Cited

U.S. PATENT DOCUMENTS

| | | | | |
|---|---|---|---|---|
| 2,931,019 A | | 3/1960 | Walters | 340/253 |
| 3,192,518 A | | 6/1965 | Sliman | 340/280 |
| 3,537,095 A | | 10/1970 | Cones | 340/280 |
| 3,596,019 A | | 7/1971 | Koester | 200/51.09 |
| 3,728,581 A | * | 4/1973 | Adamo | 361/50 |
| 4,059,843 A | * | 11/1977 | Girismen | 361/102 |
| 4,097,843 A | | 6/1978 | Basile | 340/280 |
| 5,347,095 A | * | 9/1994 | Zeder | 200/51.09 |
| 5,663,711 A | * | 9/1997 | Sanders et al. | 340/635 |
| 5,761,021 A | * | 6/1998 | Yu | 361/111 |
| 5,793,284 A | * | 8/1998 | Teague | 340/438 |
| 5,939,992 A | * | 8/1999 | Devries et al. | 340/657 |
| 6,229,450 B1 | | 5/2001 | Malmsten | 340/652 |
| 6,255,936 B1 | * | 7/2001 | Amato | 340/7.5 |
| 6,291,985 B1 | * | 9/2001 | Bush | 324/142 |
| 6,424,252 B1 | * | 7/2002 | Adler | 340/311.2 |
| 6,514,652 B2 | | 2/2003 | Cash, Jr. | 430/106 |
| 6,700,501 B2 | * | 3/2004 | Winton | 340/687 |
| 6,955,559 B2 | * | 10/2005 | Pyrros | 439/535 |

* cited by examiner

*Primary Examiner*—Daniel Wu
*Assistant Examiner*—Lam Pham
(74) *Attorney, Agent, or Firm*—Suiter Swantz pc llo

(57) ABSTRACT

The present invention is a simple, inexpensive and reliable device for monitoring and alerting of a power disruption to an appliance or a piece of equipment. An audible and/or visual alarm may be generated in the event that a specific or a piece of electrical equipment becomes disconnected from its electrical source. The device for monitoring and alerting of a power disruption may operate from an internal battery in case the electrical power source to the appliance disrupted. Additionally, a power-surge-suppression, a rechargeable battery, and a charger for the battery may make the device more reliable. The remote receiver may receive a broadcasted alarm signal from the monitoring device and then notify a user with a visual and/or audible alarm at a location where the alarm is more likely to be seen and heard.

20 Claims, 3 Drawing Sheets

DEVICE FOR MONITORING AND ALERTING OF A POWER DISRUPTION TO ELECTRICAL EQUIPMENT OR AN APPLIANCE

CROSS REFERENCE TO RELATED APPLICATIONS

The present application claims priority under 35 U.S.C. § 119 to U.S. Provisional Application Ser. No. 60/453,777 filed Mar. 11, 2003. Said U.S. Provisional Application 60/453,777 is hereby incorporated by reference.

FIELD OF THE INVENTION

The present invention relates to a device for monitoring a power disruption and particularly to an audible and/or visual alarm device for alerting users in the event that appliances and electrical equipment lose power.

BACKGROUND OF THE INVENTION

There are many home appliances and electrical equipment which require a continuous supply of electrical power in order to properly function. This may include sump pumps, spare freezers, server computers, fire alarm systems, sprinkler system timers and the like. Sometimes, appliances and equipment are located in remote areas where a user may not easily detect a power disruption. A power disruption may be caused in many ways such as unplugging of the plug of the appliance from an electrical outlet, ground fault interrupt (GFI) plug, or tripped breaker with no apparent indication of such a disruption. If there is a power disruption to an appliance that requires a constant supply of electricity, it may end up costing a great deal of money and time to remedy the situation. For example, foods stored in a spare freezer may perish if the power disruption to the spare freezer is not detected in time.

Consequently, a simple and inexpensive device that can be employed by home owners or small business owners for monitoring a power disruption and for notifying the power disruption to users who are away from the alarming device is necessary.

SUMMARY OF THE INVENTION

Accordingly, the present invention is directed to provide a simple, inexpensive and reliable device for monitoring and providing an alarm during a power disruption. Further the present invention is directed to provide a device for transmitting and relaying alarm notification of a power disruption to a remote location.

In an embodiment of the invention, a device for monitoring and alerting of a power disruption comprises generally a receptacle monitor including a circuitry that may determine whether it is receiving electricity from a conventional wall outlet and whether an appliance is mechanically plugged into the receptacle monitor. An appliance may be plugged into the receptacle monitor of the present invention which may be plugged into the conventional wall outlet. The receptacle monitor may give an audible and/or visual alert signal in case of a failure of electrical power at the wall outlet, a disconnection between the wall outlet and receptacle monitor, or disconnection between the receptacle monitor and the appliance.

In an advantageous aspect of the present invention, an internal backup battery may be included for powering the circuitry to give an audible and/or visual alert signal in case of a power disruption. A charger for the internal backup battery and a surge-suppression may make the device for monitoring and alerting of a power disruption more reliable. In an alternative embodiment of the invention, the device for monitoring and alerting of a power disruption may comprise a receptacle monitor having a transmitter that can broadcast an alarm signal to a remote monitor. The remote monitor may receive a wireless signal from the receptacle monitor and provide an alarm to a remote location. In a further advantageous aspect of the present invention, the wireless remote receiver monitor may be portable and carried by a user and alert the user on the spot about the power disruption of a certain appliance located remotely from the user.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to an embodiment of the invention, examples of which are illustrated in the accompanying drawings.

In an embodiment of the present invention, the device for monitoring and alerting a power disruption may be configured to operate on any single-phase equipment of any voltage or amperage. Preferably, the device for monitoring and alerting a power disruption may comprise at least one receptacle monitor having a circuitry that may determine whether it is receiving electricity from a conventional wall outlet (power outlet) and whether an appliance is mechanically plugged into the receptacle monitor and at least one remote monitor receiving alerting signals form the receptacle monitor and alerting a remote user.

Figure 1:
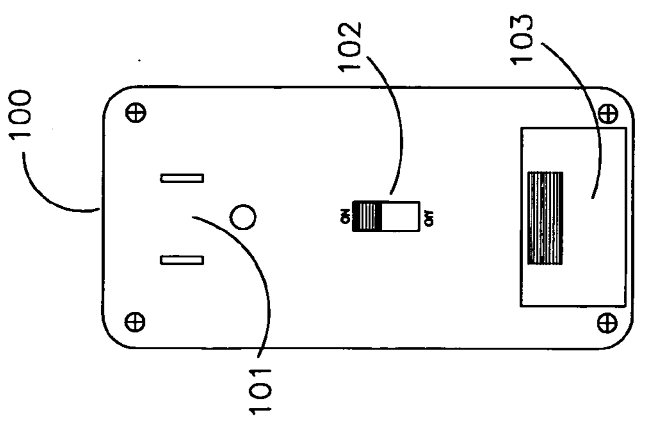
FIGS. 1–3 are perspective views from back, front and side, respectively, illustrating an embodiment of a receptacle monitor in accordance with the present invention.
Figure 2:
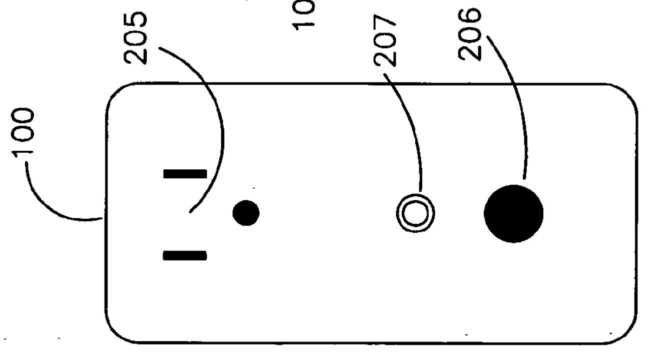
Figure 3:
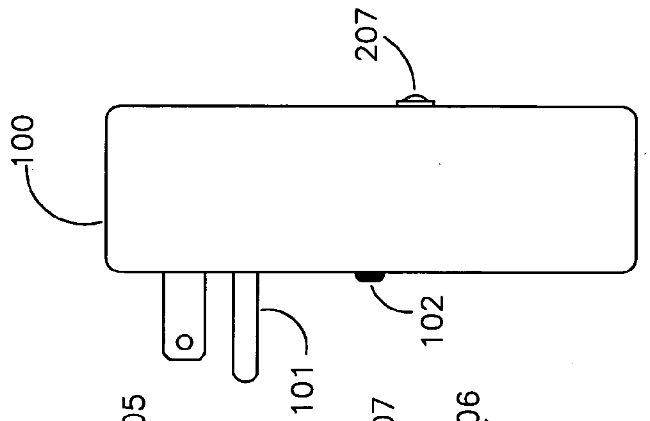

FIGS. 1–3 show perspective views of a receptacle monitor 100 generally designated for monitoring and alarming of a power disruption to an appliance or a piece of electronic equipment. The receptacle monitor 100 is preferably constructed of a suitable molded plastic. Alternatively the receptacle monitor 100 may be constructed of a flame retardant impact resistant molded plastic. In an embodiment of the present invention, the receptacle monitor 100 may comprise a conventional three prong male outlet 101 (having one phase conductor, one neutral conductor and one ground conductor) for standard one hundred ten (110) volt wall socket (power outlet). Alternatively, depending on the standard voltage of the wall socket and the appliance, various kinds of male prong may be employed. For example, the receptacle monitor 100 may comprise a two prong male outlet for standard two hundred twenty (200) volt wall socket (for most European standards). A power switch 102 may be placed on the back panel of the receptacle monitor 100 in order to be inaccessible while the receptacle monitor 100 is plugged in the wall outlet (power outlet). This position may insure that the device of monitoring and alerting of a power disruption will not be rendered inoperative unintentionally due to the switch 102 of the receptacle monitor 100 being off. A battery-cover 103 for accessing a battery that provides power to give audible and/or visual alert signals in the event of power failure of the receptacle monitor itself may be located on the back panel of the receptacle monitor 100. Additionally, the status of the battery may be monitored so that the user can be notified when the battery voltage falls below a certain safe operating range. In an alternative embodiment, a rechargeable battery may be connected to a battery charging circuitry in the receptacle monitor 100. For example, a rechargeable Nickel Metal Hydride (NiMH) battery, a rechargeable Nickel Cadmium (NiCad) battery or the like may be employed as a rechargeable backup battery.

Figure 4:
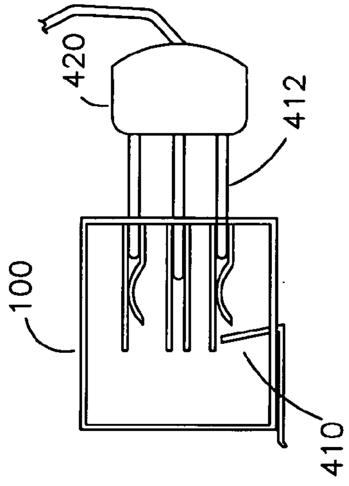
FIG. 4 is a vertical section view taken through the receptacle monitor and a plug illustrating an embodiment of the receptacle monitor in accordance with the present invention.

A conventional female receptacle outlet 205 with one small extra internal contact 410 (auxiliary contact) on the neutral side for completing the circuit that holds the alarm off may be positioned on the front panel of the receptacle monitor 100. Now referring to FIG. 4, a vertical section view taken through the receptacle monitor 100 and an exemplary plug 420 of the appliance inserted in the female receptacle outlet 205 are shown. An auxiliary contact 410 may be incorporated into the female receptacle outlet 205 that makes conductive contact with one of the bayonets 412 of the appliance being plugged in. Therefore, either two or three prong plug appliance may be inserted in the female receptacle outlet 205 and monitored for disconnections. Further, an opening 206 for audible alarm and visual alarm circuit 207 such as a light emitting diode (LED) may be exposed on the front panel of the receptacle monitor 100. One of the examples of audible alarm circuit may be an audible piezo beeper.

Figure 5:
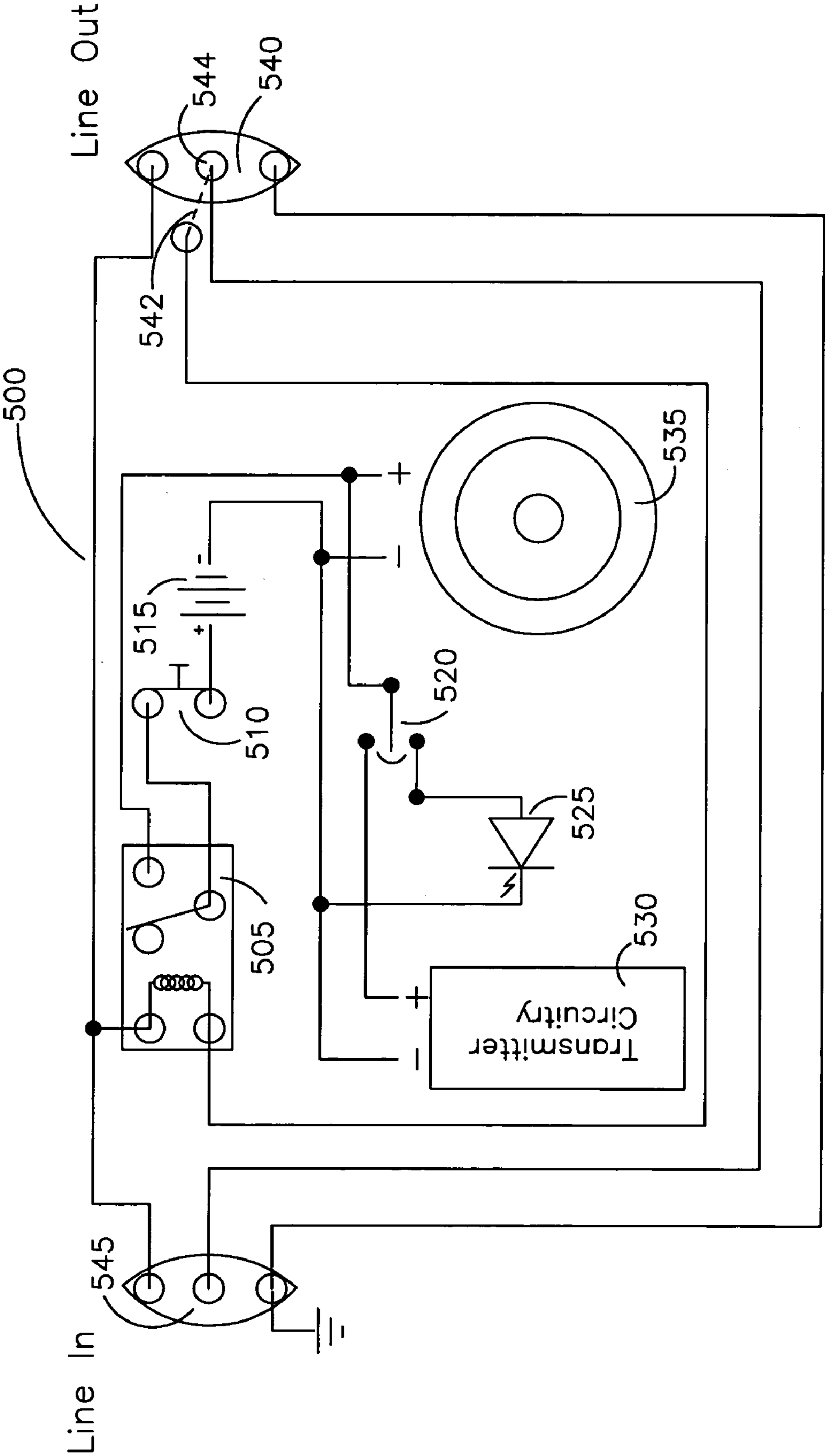
FIG. 5 is a schematic diagram showing one mode of operation of the electrical circuitry which forms the receptacle monitor of the present invention.

FIG. 5 shows a schematic diagram of the electrical circuitry 500 which forms a receptacle monitor 100 of the present invention.

In an embodiment of the present invention, the electrical circuitry 500 for the receptacle monitor 100 may comprise a three prong plug (conventional male outlet) 545 connecting to a relay 505 that is also connected through a power switch 510 to a battery 515. Electricity from the power outlet will pass through from the three prong plug 545 directly to a female receptacle outlet 540 on the receptacle monitor 100 via conductors that are rated for the duty of the outlet. For example, a receptacle monitor 100 designed for a standard wall outlet rated at 15 amps will have current carrying conductors rated at no less than 15 amps passing the current through to female receptacle outlet 540 of the receptacle monitor 100. A normally closed contact of relay 505 is connected to the input of a flasher circuit 520 for triggering or resetting a visual circuit 525, for example, an LED and also connected to the input of an audible alarm circuit 535. Additionally a normally closed contact of relay 505 is also connected to input of a transmitter circuitry 530. The transmitter circuitry 530 may transmit a signal by wireless radio frequency to a remote monitor that may be remotely located whenever power is disrupted to the monitored appliance.

A female receptacle outlet 540 may incorporate an auxiliary contact point 542 on the neutral side of the female receptacle outlet 544. The auxiliary contact point 542 may make conductive contact with the neutral male bayonet of the appliance being monitored when it is fully inserted into the female receptacle outlet 540. This will create an electrical circuit to the neutral side of the coil on a normally closed relay 505. The line side of the coil of the normally closed relay 505 will be permanently attached to the line side male bayonet of the receptacle monitor's plug 545. If the equipment or the appliance is unplugged from the receptacle monitor, the electrical connection between the auxiliary contact 542 and the actual neutral current carrying contact 544 in the female receptacle outlet 540 becomes disassociated, power is then removed from the coil of a normally closed relay 505 closing the relay contacts from the battery 515 to the flasher circuit 520, the audible alarm 535 and causes visual and audio alarm triggered. Thus, if the equipment or the appliance becomes unplugged from the receptacle monitor 500, the power is removed from the receptacle monitor 500 by a tripped breaker, tripped ground fault interrupt circuit, the male outlet 545 and female receptacle outlet 540 are conductively disconnected (power failure in the receptacle monitor itself) or the like, the line side current will be removed from the coil of the normally closed relay 505, closing the relay 505 contacts and allow current to flow from the battery 515 to the visual alarm 525, the audible alarm 535, and the transmitter circuitry 530. Furthermore, in an alternative embodiment, the receptacle monitor may comprise a power surge protection which will allow excess voltage to be carried safely to earth ground to protect itself as well as the equipment it is monitored by the receptacle monitor.

Figure 6:
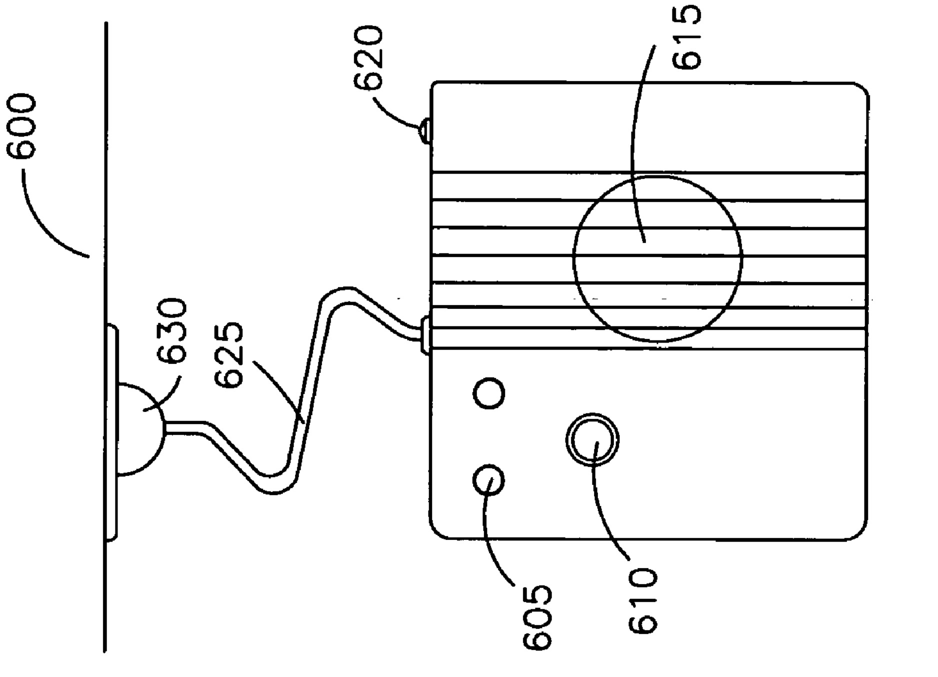
FIG. 6 is a perspective view of the remote monitor unit in accordance with the present invention.

Referring now to FIG. 6, a perspective view of a remote monitor 600 in the present invention is shown. The remote monitor 600 may be constructed of a suitable molded plastic, a flame retardant impact resistant molded plastic or the like. In an embodiment of the present invention, the remote monitor 600 may comprise a power switch 620, an opening for a visual alarm 605, an opening for an audible alarm 615, and an alarm test button 610. An electric line cord 625 may extends from the remote monitor 600 and terminate in a plug 630 suitable for plugging into a wall socket. Additionally, the remote monitor 600 may include a back up battery for function during a power failure to the remote monitor. Alternatively, the remote monitor 600 may be cordless and comprise a battery-cover for accessing a battery.

Figure 7:
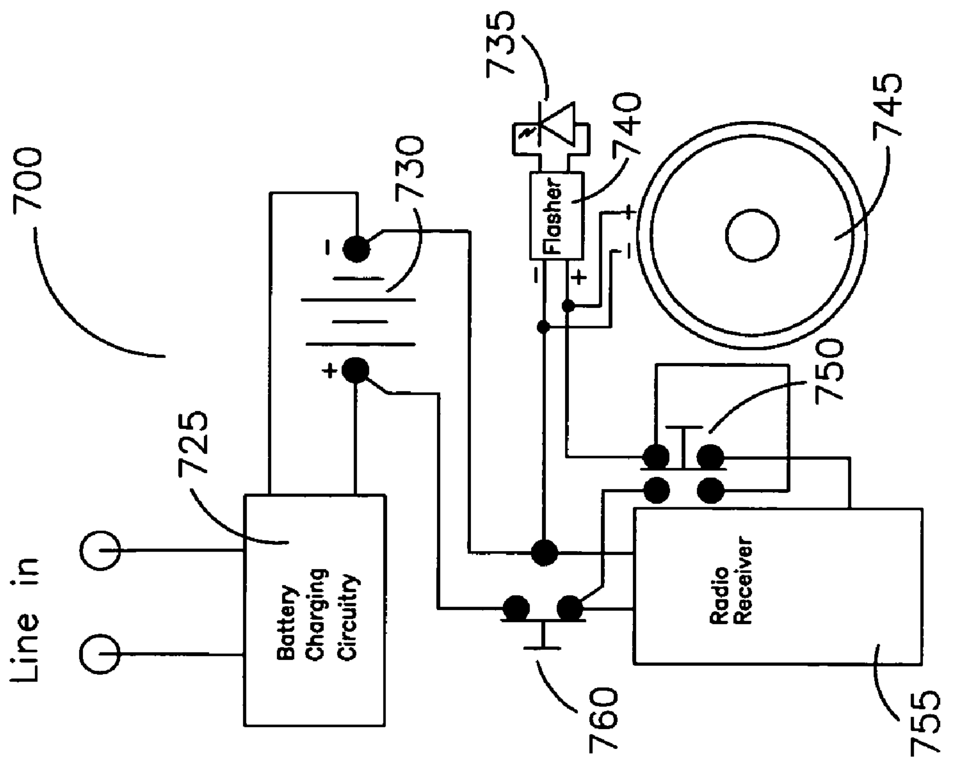
FIG. 7 is a schematic diagram showing one mode of operation of the electrical circuitry which forms the remote monitor unit of the present invention.

FIG. 7 depicts a schematic diagram of the electrical circuitry which forms the remote monitor 700 of the present invention. The remote monitor unit 700 may include a battery 730 for function during a power failure to the remote monitor. In an embodiment in the present invention, the remote monitor 700 may include a rechargeable battery 730. A battery charging circuitry 725 may be connected to the rechargeable battery 730 which is again connected through a flasher 740 for a visual alarm 735, an audible alarm 745, an alarm test button 750, a radio receiver 755, and a power switch 760. The remote monitor unit 700 may receive a wireless alerting signal via a radio receiver 755 from several receptacle monitor devices. The remote monitor 700 may be carried by the user and alert the user on the spot by using a visual alarm 735 and an audible alarm 745 in the event of the power disruption of a certain appliance located remotely from the user. For example, a sump pump may be located in the basement with a receptacle monitor device and the user in an upstairs room may be informed by the remote monitor 700 near him or her. As such, the battery operated remote monitor 700 may give great freedom for the user who has to move around in a large house or a commercial business where the alerting signal of power disruption will be readily noticed due to the portable battery operated remote monitor 700. Alternatively, the remote monitor 700 may comprise a plug and a cord providing regulated direct current power from a wall outlet to the remote monitor 700 as well as a back up battery.

Although the invention has been described with a certain degree of particularity, it should be recognized that elements thereof may be altered by persons skilled in the art without departing from the spirit and scope of the invention. It is believed that the method for the present invention and many of its attendant advantages will be understood by the foregoing description, and it will be apparent that various changes may be made in the form, construction, and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. An apparatus for monitoring and alerting a power disruption comprising:
- a housing having a first panel and a second panel;
- a male outlet on said first panel, said male outlet capable of receiving power from a power outlet when said male outlet is coupled to a power outlet;
- at least one female outlet on said second panel conductively connected to said male outlet, said at least one female outlet incorporating an auxiliary contact point on a neutral side of said at least one female outlet said auxiliary contact point making electrical contact when a male outlet of a monitored appliance is inserted into said at least female outlet;
- a monitoring circuit in said housing for detecting a power disruption for an appliance coupled to said at least one female outlet, said power disruption including a power failure in said housing, a power failure from said power outlet and a power disconnection between said appliance and said at least one female outlet;
- an alarm circuit coupled to said monitoring circuit, said alarm circuit providing an alarm upon detection of said power disruption;
- a transmitter circuit in said housing for broadcasting a wireless signal in case of said power disruption; and
- a battery in said housing providing power to said monitoring circuit, said alarm circuit and said transmitter circuit in case of said power failure in said housing.

2. The apparatus for monitoring and alerting a power disruption in claim 1, further comprising a remote monitor having:
- a radio receiver circuit receiving said wireless signal from said transmitter circuit in said housing;
- a power switch for selectively enabling said remote monitor;
- an alarm circuit for alerting a remote user upon reception of said wireless signal, said alarm circuit including a visual alarm and an audible alarm; and
- a battery providing power to radio receiver circuit and said alarm circuit.

3. The apparatus for monitoring and alerting a power disruption in claim 1, wherein said alarm circuit includes a visual alarm and an audible alarm.

4. The apparatus for monitoring and alerting a power disruption in claim 1, further comprising a power switch on said first panel.

5. The apparatus for monitoring and alerting a power disruption in claim 1, wherein said battery includes a rechargeable battery.

6. The apparatus for monitoring and alerting a power disruption in claim 5, further comprising a battery charging circuit in said housing.

7. The apparatus for monitoring and alerting a power disruption in claim 1, further comprising a power surge suppression circuit.

8. An apparatus for monitoring and alerting a power disruption comprising:
- means for connecting a male outlet on a back panel of a housing and at least one female outlet on front panel of said housing, said male outlet capable of receiving power from a power outlet when said male outlet is coupled to a power outlet said least one female outlet on said front panel incorporating an auxiliary contact point on a neutral side, said auxiliary contact point making electrical contact when a male outlet of a monitored appliance is inserted into said at least female outlet;
- means for monitoring a power disruption for an appliance coupled to said at least one female outlet, said power disruption including a power failure in said housing, a power failure from said power outlet and a power disconnection between said appliance and said at least one female outlet;
- means for alarming a user upon detection of said power disruption;
- means for broadcasting a wireless signal to a remote monitor in case of said power disruption; and
- means for providing power to a plurality of circuits in said housing in case of said power disruption.

9. The apparatus for monitoring and alerting a power disruption in claim 8, wherein said alarming means further includes means for visual alarming and audible alarming.

10. The apparatus for monitoring and alerting a power disruption in claim 8, further comprising means for selective enabling said apparatus.

11. The apparatus for monitoring and alerting a power disruption in claim 8, wherein said providing power means further includes means for recharging said providing power means.

12. The apparatus for monitoring and alerting a power disruption in claim 8, further comprising:
- means for selectively enabling said remote monitor;
- means for receiving said wireless signal from said broadcasting means to said remote monitor;
- means for alerting a remote user by a visual alarm and an audible alarm upon reception of said wireless signal; and
- means for providing power to a plurality of circuits in a remote monitor.

13. The apparatus for monitoring and alerting a power disruption in claim 8, further comprising means for suppressing a power surge circuit.

14. A system for monitoring and alerting a power disruption comprising:
- a receptacle monitor including:
- a housing having a first panel and a second panel;

a male outlet on said first panel, said male outlet capable of receiving power from a power outlet when said male outlet is coupled to a power outlet;

at least one female outlet on said second panel incorporating an auxiliary contact point on a neutral side, said auxiliary contact point making electrical contact when a male outlet of a monitored appliance is inserted into said at least female outlet;

an electrical circuit including conductors connecting said male outlet on said first panel and said female outlet;

a monitoring circuit for detecting a power disruption for an appliance coupled to said at least one female outlet, said power disruption including a power failure in said housing, a power failure from said power outlet and a power disconnection between said appliance and said at least one female outlet;

an alarm circuit coupled to said monitoring circuit, said alarm circuit providing an alarm upon detection of said power disruption;

a transmitter circuit for broadcasting a wireless signal in case of said power disruption; and a battery for providing power to said monitoring circuit, said alarm circuit and said transmitter circuit in case of said power failure; and a remote monitor for alerting a remote user including:

a radio receiver circuit receiving said wireless signal from said transmitter circuit in said receptacle monitor;

a power switch for selectively enabling said remote monitor;

an alarm circuit for alerting said remote user upon reception of said wireless signal; and a battery providing power to radio receiver circuit, said alarm circuit.

15. The system for monitoring and alerting a power disruption in claim 14, wherein said alarm circuit includes a visual alarm and an audible alarm.

16. The system for monitoring and alerting a power disruption in claim 14, further comprising a power switch on said first panel.

17. The system for monitoring and alerting a power disruption in claim 14, wherein said battery includes a rechargeable battery.

18. The system for monitoring and alerting a power disruption in claim 16, further comprising a battery charging circuit in said receptacle monitor.

19. The system for monitoring and alerting a power disruption in claim 14, further comprising a power surge suppression circuit coupled with said electric circuit.

20. The system for monitoring and alerting a power disruption in claim 14, further comprising a plurality of receptacle monitors and at least one remote monitor receiving said wireless signal from said plurality of receptacle monitors and alerting a remote user upon reception of said wireless signal from one of said receptacle monitor.

* * * * *